United States Patent
Zhang

(10) Patent No.: US 12,192,133 B2
(45) Date of Patent: Jan. 7, 2025

(54) METHOD AND DEVICE FOR WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 352 days.

(21) Appl. No.: 17/744,761

(22) Filed: May 16, 2022

(65) Prior Publication Data

US 2022/0278799 A1 Sep. 1, 2022

Related U.S. Application Data

(63) Continuation of application No. PCT/CN2020/124713, filed on Oct. 29, 2020.

(30) Foreign Application Priority Data

Nov. 19, 2019 (CN) .......................... 201911136306.9

(51) Int. Cl.
*H04L 5/00* (2006.01)
*H04W 56/00* (2009.01)
(Continued)

(52) U.S. Cl.
CPC ......... *H04L 5/0048* (2013.01); *H04W 56/001* (2013.01); *H04W 84/06* (2013.01); *H04W 92/18* (2013.01)

(58) Field of Classification Search
None
See application file for complete search history.

(56) References Cited

U.S. PATENT DOCUMENTS

2001/0005907 A1* 6/2001 Pekonen ............ H04N 7/17309
 725/111
2019/0223224 A1 7/2019 Park

FOREIGN PATENT DOCUMENTS

CN 102196479 A 9/2011
CN 103517398 A 1/2014
(Continued)

OTHER PUBLICATIONS

ISR received in application No. PCT/CN2020/124713 dated Jan. 27, 2021.
(Continued)

*Primary Examiner* — Adolf Dsouza

(57) ABSTRACT

An illustrative aspect, performed by a first node, includes receiving a first radio signal, first information and second information; transmits a second radio signal in a first target slot; herein, the first radio signal is used to indicate a synchronization timing of a first time window, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length.

20 Claims, 4 Drawing Sheets

(51) Int. Cl.
*H04W 84/06* (2009.01)
*H04W 92/18* (2009.01)

(56) References Cited

FOREIGN PATENT DOCUMENTS

| CN | 108023717 A | | 5/2018 | | |
|----|-------------|---|--------|---|---|
| CN | 109005585 A | | 12/2018 | | |
| CN | 109474396 A | * | 3/2019 | ........... | H04B 7/0626 |
| CN | 110169186 A | | 8/2019 | | |

OTHER PUBLICATIONS

First Office Action of Chinses patent application No. CN201911136306.9 dated Jan. 4, 2022.
First Search Report of Chinses patent application No. CN201911136306.9 dated Dec. 24, 2021.
Notification to Grant Patent Right for Invention of Chinses patent application No. CN201911136306.9 dated Jun. 22, 2022.
Huawei, HiSilicon Discussion on timing advance and RACH procedures for NTN 3GPP TSG RAN WG1 Meeting #96bis R1-1904000 Mar. 30, 2019.

\* cited by examiner

METHOD AND DEVICE FOR WIRELESS COMMUNICATION

CROSS REFERENCE TO RELATED APPLICATIONS

This application is the continuation of International Patent Application No. PCT/CN2020/124713, filed on Oct. 29, 2020, which claims the priority benefit of Chinese Patent Application No. 201911136306.9, filed on Nov. 19, 2019, the full disclosure of which is incorporated herein by reference.

BACKGROUND

Technical Field

The present disclosure relates to transmission methods and devices in wireless communication systems, and in particular to a transmission scheme and device related to large delay.

Related Art

Facing increasingly higher communication requirements, 3rd Generation Partner Project (3GPP) started a research on Non-Terrestrial Network (NTN) communications, 3GPP RAN #80 plenary decided to carry out a research project on "solutions for New Radio (NR) supporting NTN", which is a continuation (RP-171450) of a prior research project of "NR supporting NTN", where Timing Advance (TA) is an important research aspect. D2D is a way to communicate directly between UEs via sidelink, and a research on D2D communications assisted by NTN will become one of future evolution directions of 3GPP.

SUMMARY

In order to avoid interferences from downlink transmission signals, Device to Device (D2D) or Vehicle-to-Everything (V2X) communications usually cannot employ downlink time-frequency resources. Therefore, for a UE in a connected state, wireless transmission on SL is usually synchronized with an uplink transmission timing.

Inventors have found through researches that in communications with large delay such as NTN, a TA of uplink transmission of UE is very large and can significantly exceed 1 millisecond; a base station can utilize a slot occupied by, for example, Downlink Control Information (DCI) for adjusting an uplink transmission of any UE, and the UE in connected state may not know an actual slot of a transmitted uplink radio signal arriving at the base station side (that is, a TA adopted by the UE may not be complete, and partial the TA is implemented by DCI scheduling).

Therefore, a problem in communications with large delay is: different UEs may have different understanding of time-domain resources configured by the base station for uplink transmission or sidelink transmission. Further, the problem may be even more complicated if considering UEs in idle state, since the UEs in idle state do not receive a Timing Advance Command (TAC) Media Access Control (MAC) Control Element (CE), a radio transmission on sidelink is always synchronized with a downlink transmission timing, that is, their understanding of time-domain resources configured by the base station is more different from that of UEs in connected state.

To address the above problem, the present disclosure provides a solution. In the description of the above problems, large delay scenarios such as NTN are adopted as an example; the application is also applicable to small delay scenarios such as terrestrial transmission, where similar technical effects can be achieved. Additionally, the adoption of a unified solution for various scenarios contributes to the reduction of hardware complexity and costs.

It should be noted that if no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:

receiving a first radio signal, first information and second information; and transmitting a second radio signal in a first target slot;

herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the above method ensures that when a transmission of the second radio signal arrives at a transmitter of the first radio signal, a "first time length" level synchronization can be implemented, avoiding the transmitter of the first radio signal from being interfered across "first time length".

In one embodiment, the above method ensures that a TA adopted by the first node relative to the observed first time window is not too large, avoiding interferences incurred by different UEs (whether it is in connected state or not) having a too different understanding of the first slot.

In one embodiment, a sum of the second time offset plus L2 first time length(s) is equal to the first time offset, L2 is equal to L1, or L2 is 1 less than L1.

In one embodiment, the second time offset is less than the first time offset.

Specifically, according to one aspect of the present disclosure, characterized in that when the first residual time offset is less than a first time threshold, a sum of the first residual time offset plus the first time length is equal to the second time offset; when the first residual time offset is greater than a first time threshold, the first residual time offset is equal to the second time offset.

In one embodiment, the above aspect can minimize the interferences incurred by a radio signal transmitted by an adjacent UE to a transmitter of the first radio signal.

Specifically, according to one aspect of the present disclosure, characterized in that the second information indicates a fourth time offset, the first time offset is linearly correlated with the fourth time offset, and a linear correlation coefficient from the first time offset to the fourth time offset is 1.

Specifically, according to one aspect of the present disclosure, characterized in that the first transmitter transmits a third radio signal in a second target slot; when the third radio signal is transmitted in uplink, a first index is used to generate the third radio signal, and when the third radio signal is transmitted in sidelink, a second index is used to generate the third radio signal; a product of a difference value obtained by subtracting the first index from the second index multiplied by the first time length is equal to a difference value obtained by subtracting the second time offset from the first time offset.

Specifically, according to one aspect of the present disclosure, characterized in that the third radio signal is transmitted in sidelink, and the third radio signal indicates the second index.

The present disclosure provides a method in a second node for wireless communications, comprising:
  transmitting a first radio signal, first information and second information; and
  processing interferences from a second radio signal, the second radio signal being transmitted in a first target slot;
  herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

Specifically, according to one aspect of the present disclosure, characterized in that when the first residual time offset is less than a first time threshold, a sum of the first residual time offset plus the first time length is equal to the second time offset; and when the first residual time offset is greater than a first time threshold, the first residual time offset is equal to the second time offset.

Specifically, according to one aspect of the present disclosure, characterized in that the second information indicates a fourth time offset, the first time offset is linearly correlated with the fourth time offset, and a linear correlation coefficient from the first time offset to the fourth time offset is 1.

The present disclosure provides a first node for wireless communications, comprising:
  a first receiver, receiving a first radio signal, first information and second information; and
  a first transmitter, transmitting a second radio signal in a first target slot;
  herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

The present disclosure provides a second node for wireless communications, comprising:

a second transmitter, transmitting a first radio signal, first information and second information; and
  a second processor, processing interferences from a second radio signal, the second radio signal being transmitted in a first target slot;
  herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
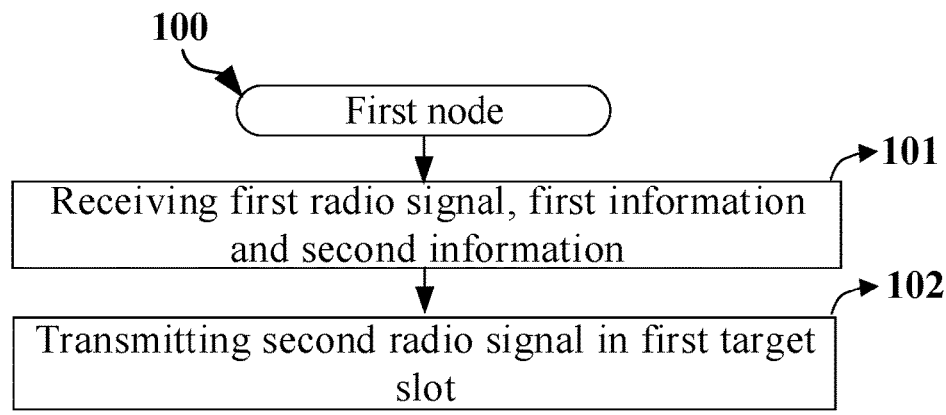
FIG. 1 illustrates a flowchart of transmitting a second radio signal according to one embodiment of the present disclosure.

Embodiment 1 illustrates a flowchart of transmitting a second radio signal according to one embodiment of the present disclosure, as shown in FIG. 1. In FIG. 1, each box represents a step.

In embodiment 1, a first node receives a first radio signal, first information and second information in step 101; and transmits a second radio signal in a first target slot in step 102;

in embodiment 1, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the first node is a User Equipment (UE).

In one embodiment, the first node is a Base Station (BS).

In one embodiment, the first time offset is equal to a TA when the first node performs an uplink transmission.

In one embodiment, the first time offset is a TA when the first node performs an uplink transmission without considering Downlink Control Information (DCI).

In one embodiment, the first time offset comprises a TA configured by a higher-layer signaling when the first node performs an uplink transmission.

In one embodiment, a sum of the second time offset plus L2 first time length(s) is equal to the first time offset, L2 is equal to L1, or L2 is 1 less than L1.

In one embodiment, the second time offset does not exceed the first time offset.

In one embodiment, the second time offset is equal to the first residual time offset.

In one embodiment, the second time offset is linearly correlated to the first residual time offset, and a linear correlation coefficient from the second time offset to the first residual time offset is 1.

In one embodiment, the second time offset is equal to a sum of the first residual time offset plus a third time offset.

In one embodiment, the third time offset is related to a subcarrier spacing of a subcarrier occupied by the second radio signal.

In one embodiment, the third time offset is configurable.

In one embodiment, the third time offset is 628 Ts, and the Ts is 1/30720 ms.

In one embodiment, the third time offset is the first time length.

In one embodiment, a transmitter of the first radio signal is a base station, and the synchronization timing of the first time window is a downlink synchronization timing.

In one embodiment, the first radio signal comprises a Primary Synchronization Signal (PSS) and a Secondary Synchronization Signal (SSS), and a measurement performed on the first radio signal is used to determine a start time of a multicarrier symbol in the first time window.

In one embodiment, the first radio signal is transmitted periodically.

In one embodiment, L1 is 1.

In one embodiment, L1 is greater than 1.

In one embodiment, the second time offset is equal to a remainder obtained by dividing the first time offset by the first time length.

In one embodiment, the first time window comprises all slots corresponding to a System Frame Number (SFN) cycle period.

In one embodiment, the first time offset is greater than the first time length.

In one embodiment, the first time window comprises Q1 consecutive slots, and Q1 is a positive integer greater than 1.

In one embodiment, a duration of any two of the Q1 slots is the same.

In one embodiment, there at least exist durations of two of the Q1 slots being different.

In one embodiment, Q1 is 10240.

In one embodiment, a duration of any of the Q1 slots does not exceed 1 ms.

In one embodiment, a duration of each of the Q1 slots is 1 ms.

In one embodiment, each of the Q1 slots comprises 14 multicarrier symbols.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multi-carrier symbol is a Filter Bank Multicarrier (FBMC) symbol.

In one embodiment, the synchronization timing of the first time window comprises a start time of the first time window and an end time of the first time window.

In one embodiment, the synchronization timing of the first time window comprises a start time of each slot in the first time window and an end time of each slot in the first time window.

In one embodiment, the synchronization timing of the first time window comprises a start time of each multicarrier symbol in the first time window and an end time of each multicarrier symbol in the first time window.

In one embodiment, the first information indicates a first slot group out of the first time window; the first slot group comprises a plurality of slots, and the first slot is a slot in the first slot group.

In one embodiment, the first slot group comprises all slots in a V2X resource pool.

In one embodiment, the first time length is fixed.

In one embodiment, the first time length is configurable.

In one embodiment, the first time length is 1 ms.

In one embodiment, the first time length is a duration of a slot.

In one embodiment, the first time length comprises and only comprises 14 multicarrier symbols.

In one embodiment, the first time length is related to the first time offset.

In one embodiment, the first node is a UE in a Radio Resource Control (RRC) connected state.

In one embodiment, a transmitter of the first information is a base station (eNB).

In one embodiment, a transmitter of the first information is a Non-Terrestrial Network (NTN) base station.

In one embodiment, the NTN base station is one of a Geostationary Earth Orbiting (GEO) satellite, a Medium Earth Orbiting (MEO) satellite, a Low Earth Orbit (LEO) satellite, a Highly Elliptical Orbiting (HEO) satellite, and an Airborne Platform.

Embodiment 2

Figure 2:
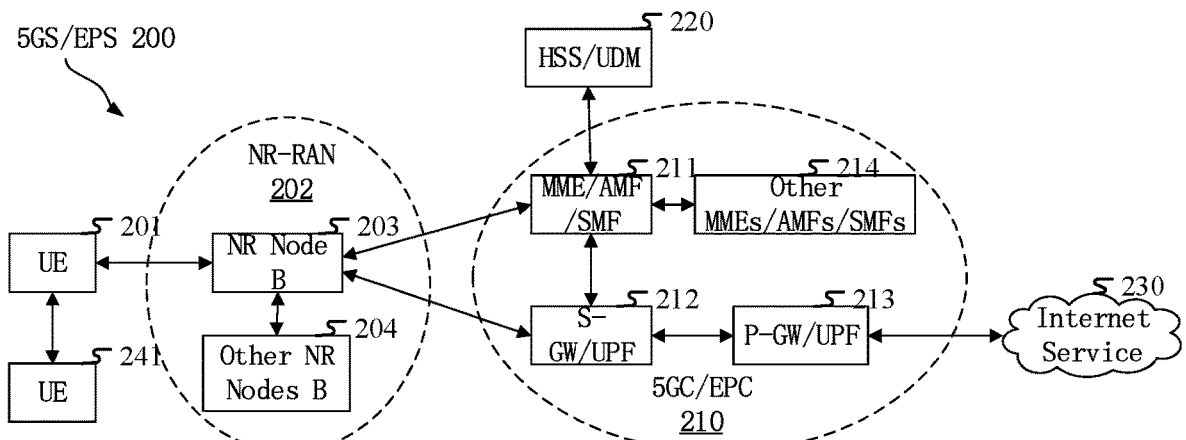
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure is the UE 201, and the second node in the present disclosure is the gNB 203.

In one embodiment, the second node in the present disclosure is the UE 201, and the first node in the present disclosure is the gNB 203.

In one embodiment, the UE 201 corresponds to the first node in the present disclosure.

In one embodiment, the UE 241 corresponds to a receiver of the second radio signal in the present disclosure.

In one embodiment, the UE 241 is a terminal covered by the second node in the present disclosure.

In one embodiment, a radio link between the UE 201 and the UE 241 corresponds to a Sidelink (SL) in the present disclosure.

In one embodiment, a radio link from the UE 201 to NR node B is an uplink.

In one embodiment, a radio link from NR node B to UE 201 is a downlink.

In one embodiment, the UE 201 supports NTN communications.

In one embodiment, the UE 201 supports communications within networks with large delay differences.

In one embodiment, the UE 201 supports Terrestrial Networks (TN) communications.

In one embodiment, the UE 241 supports NTN communications.

In one embodiment, the UE 241 supports communications within networks with large delay differences.

In one embodiment, the UE 241 supports Terrestrial Networks (TNs) communications.

In one embodiment, the gNB 203 corresponds to the second node in the present disclosure.

In one embodiment, the gNB 203 supports communications within NTNs.

In one embodiment, the gNB 203 supports communications within networks with large delay differences.

In one embodiment, the gNB 203 supports communications within TNs.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large delay differences.

In one embodiment, the gNB 203 is a flight platform device.

In one embodiment, the gNB 203 is satellite equipment.

Embodiment 3

Figure 3:
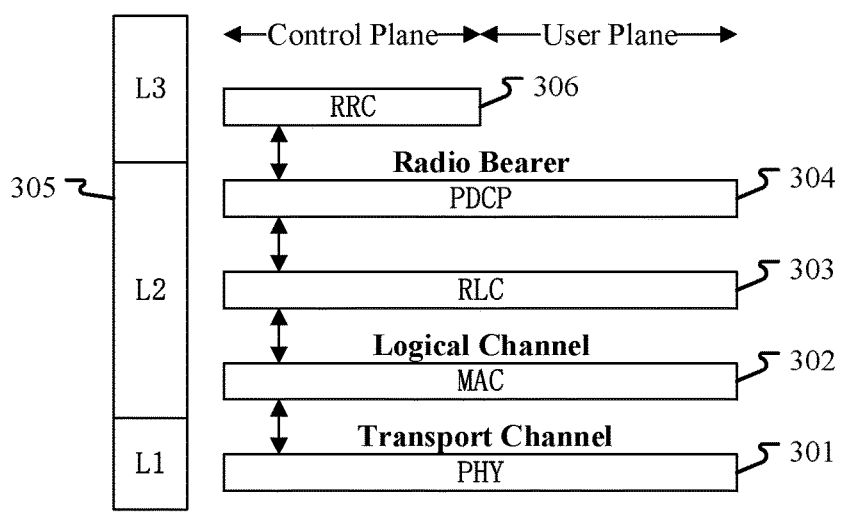
FIG. 3 illustrates a schematic diagram of a radio protocol architecture of a user plane and a control plane according to one embodiment of the present disclosure.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 or physical layer in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 layer 305 belongs to a higher layer.

In one embodiment, the L3 layer RRC sublayer 306 belongs to a higher layer.

In one embodiment, the first information in the present disclosure is generated by the RRC 306.

In one embodiment, the second information in the present disclosure is generated by the MAC 302.

In one embodiment, the second information in the present disclosure is generated by the RRC 306 and the MAC 302.

In one embodiment, the first radio signal in the present disclosure is generated by the PHY 301.

In one embodiment, the first radio signal in the present disclosure is generated by the MAC 302.

In one embodiment, the first radio signal in the present disclosure is generated by the RRC 306.

Embodiment 4

Figure 4:
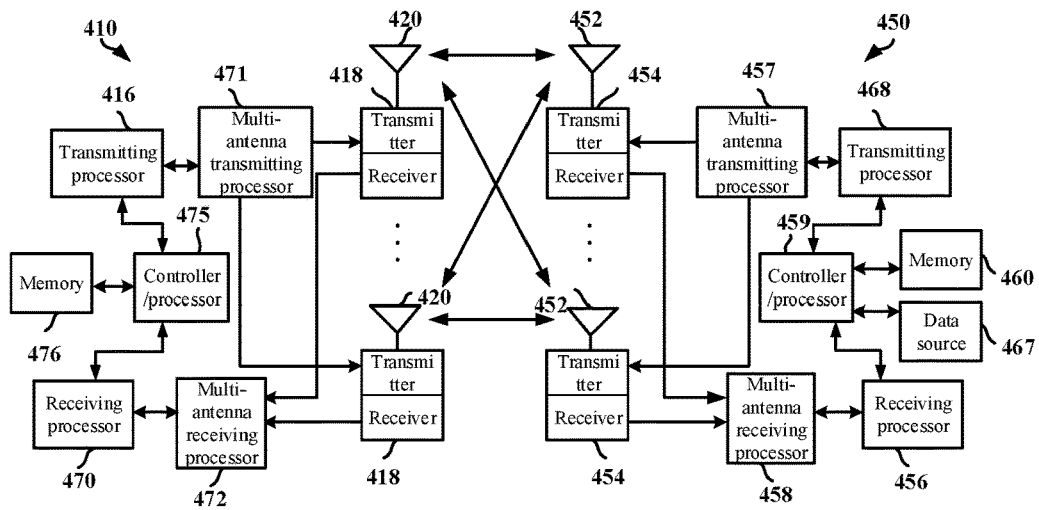
FIG. 4 illustrates a schematic diagram of hardware modules of a communication node according to one embodiment of the present disclosure.

Embodiment 4 illustrates a schematic diagram of hardware modules of a communication node according to one embodiment of the present disclosure, as shown in FIG. 4.

FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second node 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: receives a first radio signal, first information and second information; and transmits a second radio signal in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the first communication device 450 comprises at least one processor and at least one memory. a memory that stores a computer readable instruction program. The computer readable instruction program generates an action when executed by at least one processor. The action includes: receiving a first radio signal, first information and second information; and transmitting a second radio signal in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first radio signal, first information and second information; and processes interferences from a second radio signal, the second radio signal is transmitted in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the second communication device 410 comprises a memory that stores a computer readable instruction program. The computer readable instruction program generates an action when executed by at least one processor. The action includes: transmitting a first radio signal, first information and second information; processing interferences from a second radio signal, the second radio signal being transmitted in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the first communication device 450 corresponds to a first node in the present disclosure.

In one embodiment, the second communication device 410 corresponds to a second node in the present disclosure.

In one embodiment, the second communication device 410 corresponds to a receiver of the second radio signal in the present disclosure.

In one embodiment, the first communication device 450 is a UE.

In one embodiment, the second communication device 410 is a base station.

In one embodiment, the second communication device 410 is a UE.

In one embodiment, the antenna 452, the receiver 454, the multi-antenna receiving processor 458, the receiving processor 456 and the controller/processor 459 are used to receive a first radio signal, first information and second information; the antenna 420, the transmitter 418, the multi-antenna transmitting processor 471, the transmitting processor 416 and the controller/processor 475 are used to transmit a first radio signal, first information and second information.

In one embodiment, the antenna 452, the transmitter 454, the multi-antenna transmitting processor 457, the transmitting processor 468, and the controller/processor 459 are used to transmit a second radio signal; the antenna 420, the receiver 418, the multi-antenna receiving processor 472, the receiving processor 470 and the controller/processor 475 are used to receive a second radio signal.

In one embodiment, at least one of the antenna 452, the transmitter 454, the multi-antenna transmitting processor 457, the transmitting processor 468, and the controller/processor 459 is used to transmit a third radio signal; the antenna 420, the receiver 418, the multi-antenna receiving processor 472, the receiving processor 470 and the controller/processor 475 are used to receive a third radio signal.

Embodiment 5

Figure 5:
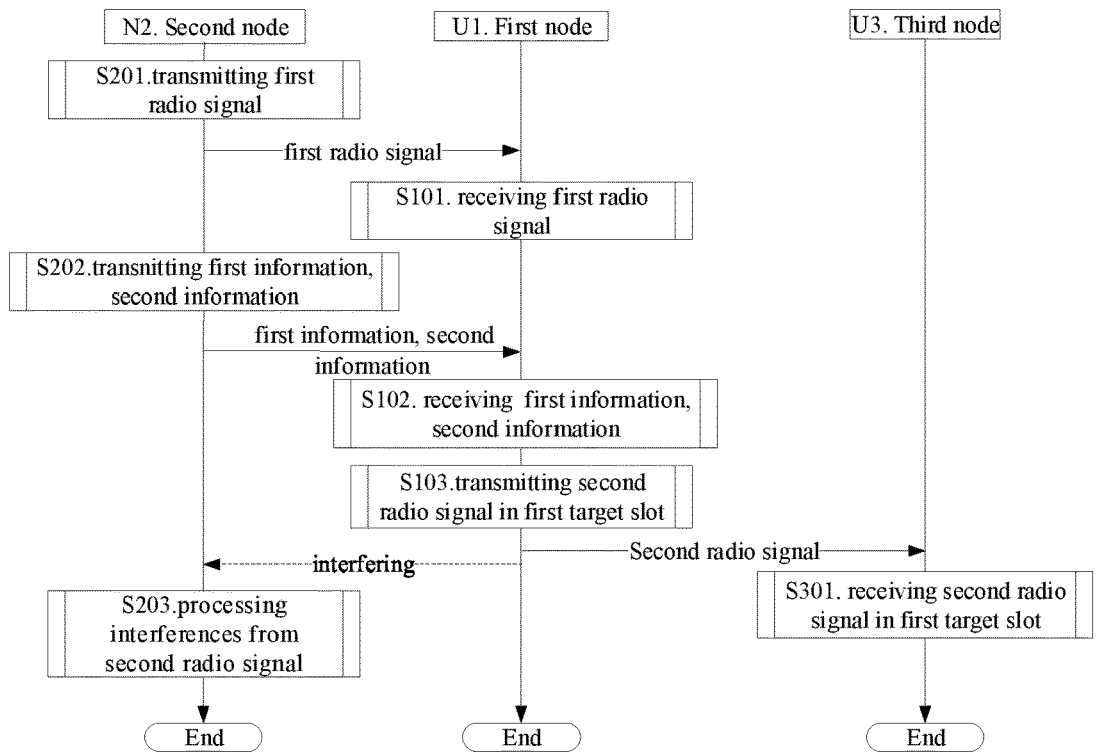
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. A second node N2 is a maintenance base station of a serving cell of a first node U1; the second node N2 and the first node U1 are in communications via a Uu interface link; the first node U1 and a third node U3 are in communications via sidelink; it is particularly underlined that the order illustrated in the embodiment does not put constraints over sequences of signal transmissions and implementations.

The first node U1 receives a first radio signal in step S101; receives first information and second information in step S102; and transmits a second radio signal in a first target slot in step S103;

the second node N2 transmits a first radio signal in step S201; transmits first information and second information in step S202; and processes interferences from a second radio signal in step S203.

In embodiment 5, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, the phrase of processing interferences from a second radio signal includes: indicating a terminal (other than the first node U1) to improve transmit power to improve a Signal to Interference and Noise Ratio (SINR) of a useful signal received by an interfered slot.

In one embodiment, the phrase of processing interferences from a second radio signal includes: indicating the first node U1 to reduce transmit power of the second signal to improve an SINR of a useful signal received by an interfered slot.

In one embodiment, the phrase of processing interferences from a second radio signal includes: avoid receiving a useful signal by an interfered slot by scheduling.

In one embodiment, the phrase of processing interferences from a second radio signal includes: adjusting a spatial Rx parameter of an interfered slot to receive a useful signal, and the spatial Rx parameter of the interfered slot suppress the second radio signal.

In one embodiment, the spatial Rx parameter comprises an analog receiving beam, and the first node U1 is located outside the coverage of the spatial Rx parameter of the interfered slot.

In one embodiment, the spatial Rx parameter comprises a digital receiving beam, and the first node U1 is located outside the coverage of the spatial Rx parameter of the interfered slot.

In one embodiment, the interfered slot is a slot after the first target slot delays the first time offset.

In one embodiment, a slot corresponding to the interfered slot in the first time window is a slot of L2 first time length(s) before the first slot, and a sum of the second time offset plus L2 first time length(s) is equal to the first time offset.

In one embodiment, L2 is equal to L1, or L2 is 1 less than L1.

In one embodiment, the second information indicates a fourth time offset, the first time offset is linearly correlated with the fourth time offset, and a linear correlation coefficient from the first time offset to the fourth time offset is 1.

In one embodiment, the fourth time offset is related to a subcarrier bandwidth of a subcarrier occupied by the second radio signal.

In one embodiment, the second information comprises a TAC comprised in a Random Access Response (RAR), and the fourth time offset is a time adjustment indicated by the second information; the first time offset is equal to the fourth time offset.

In one subembodiment of the above embodiment, the second information indicates L3, L3 being a non-negative integer, the fourth time offset is L3 time unit(s), each of the L3 time unit(s) is a reciprocal of a subcarrier bandwidth of a subcarrier occupied by the second radio signal then divided by 128, each of the L3 time unit(s) is measured by second, and a subcarrier bandwidth of a subcarrier occupied by the second radio signal is measured by Hz.

In one embodiment, the second information comprises first sub-information, the first sub-information indicates a first time adjustment, and the fourth time offset is linearly related to the first time adjustment.

In one embodiment, the first sub-information is broadcast.

In one embodiment, the first sub-information belongs to a System Information Block (SIB).

In one embodiment, the first sub-information is adopted by a first UE group, and the first node is a UE in the first UE group.

In one embodiment, the first time adjustment is related to a geographic location of the first node.

In one embodiment, the first time adjustment is related to a distance between a transmitter of the first radio signal and a first reference point, and the first reference point is a place closest to the transmitter of the first radio signal within a terrestrial area to which the first node belongs.

In one embodiment, the first time adjustment is equal to a quotient obtained by dividing the distance between a transmitter of the first radio signal and the first reference point by the speed of light.

In one embodiment, L3 is not greater than 3846.

In one embodiment, the second information comprises a TAC other than an RAR (i.e., not belonging to the RAR), the fourth time offset is linearly related to a time adjustment indicated by the second information, and a sum of a TA adopted by the first node for performing an uplink transmission before applying the second information plus the fourth time offset is equal to the first time offset.

In one subembodiment of the above embodiment, the second information indicates L4, L4 being a non-negative integer, the fourth time offset is L4-31 time unit(s), each of the L4 time unit(s) is a reciprocal of a subcarrier bandwidth of a subcarrier occupied by the second radio signal then divided by 128, each of the L3 time unit(s) is measured by second, and a subcarrier bandwidth of a subcarrier occupied by the second radio signal is measured by Hz.

In one embodiment, L4 is not greater than 63.

In one embodiment, a subcarrier bandwidth of a subcarrier occupied by the second radio signal is FF times of 15 kHz, and FF is a positive integer power of 2.

In one embodiment, the first time offset is $TA+K_{offset} \cdot T_1$, where TA, $K_{offset}$, and $T_1$ are respectively a timing advance, a number of delay slots, and a duration of slots occupied by the second radio signal; the second information indicates TA and $K_{offset}$.

In one subembodiment of the above embodiment, the first node U1 is in an RRC connected state.

In one embodiment, the first time offset is $K_{offset} \cdot T_1$, where $K_{offset}$ and $T_1$ are defined as above.

In one subembodiment of the above embodiment, the first node U1 is in an RRC idle state.

In one embodiment, the $K_{offset}$ is cell public.

In one embodiment, the $K_{offset}$ is terminal-group-specific, the terminal group comprises at least one terminal, and the first node U1 belongs to the terminal group.

In one embodiment, the TA is indicated by a TA command.

In one embodiment, the first residual time offset is mod (a first time offset, $T_1$), where mod (A, B) represents a remainder of A divided by B.

In one embodiment, the second time offset is the first residual time offset.

In one embodiment, the second time offset is ($T_1$+the first residual time offset).

In one embodiment, the first time offset is $$\sum_{i=1}^{I-1} ta_i + ta_I + K_{offset} \cdot T_1,$$

where the second information indicates $ta_i$ and $K_{offset}$, $ta_i$ is a Timing Advance Command (TAC) received by the first node U1 for a i (i=1, . . . , i−1) time in a current RRC connection, and $ta_i$ is received by the first node U1 before the second information.

In one subembodiment of the above embodiment, the fourth time offset is $ta_1 + K_{offset} \cdot T_1$.

In one embodiment, the second node N2 is a base station (eNB).

In one embodiment, the second node N2 is an NTN base station.

In one embodiment, the NTN base station is one of a Geostationary Earth Orbiting (GEO) satellite, a Medium Earth Orbiting (MEO) satellite, a Low Earth Orbit (LEO) satellite, a Highly Elliptical Orbiting (HEO) satellite, and an Airborne Platform.

In one embodiment, the first node U1 is a UE.

In one embodiment, the third node U3 is a device used for sidelink communications.

In one embodiment, the second node N2 is a reference synchronization source of the first node U1.

In one embodiment, the first node U1 is a reference synchronization source of the third node U3.

In one embodiment, the reference synchronization source refers to a node referenced by a synchronization timing of a UE.

In one embodiment, the first radio signal indicates a SystemFrameNumber (SFN).

In one embodiment, the first information is all or part of a MAC layer signaling.

In one embodiment, the first information comprises all or part of a MAC RadomAccessResponse (RAR).

In one embodiment, the first information comprises a TAC MAC ControlElement (CE).

In one embodiment, the first information comprises a MasterInformationBlock (MIB) and a TAC.

In one embodiment, the first time window is determined according to a reception synchronization timing of the first receiver N1.

In one embodiment, the first time window is a cycle of an SFN.

In one embodiment, the first time window occurs periodically, and a cycle of the first time window is Q1 slot(s), Q1 being a positive integer.

In one embodiment, Q1 is 1024, and the Q1 slots are consecutive.

In one embodiment, Q1 is less than 1024, there at least exists one slot interval, and there exists a slot belonging to the first time window respectively before and after the slot interval.

In one embodiment, Q1 is 10240, and the Q1 slots are consecutive.

In one embodiment, Q1 is less than 10240, there at least exists one slot interval, and there exists a slot belonging to the first time window respectively before and after the slot interval.

In one embodiment, the second radio signal comprises a part of MasterInformationBlock-SL.

In one embodiment, the second radio signal comprises a part of MasterInformationBlock-SL-V2X.

In one embodiment, the second radio signal is used to determine a sidelink synchronization timing.

In one embodiment, the second radio signal is used to indicate a frame number transmitting a Sidelinksynchronizing signal (SLSS) and a Sidelink Broadcast Channel (SL-BCH).

In one embodiment, the second radio signal comprises a DirectFrameNumber (DFN), and the DFN occupies X bit(s), X being a positive integer.

In one embodiment, X is equal to 10.

In one embodiment, the second radio signal comprises a DirectSubframeNumber, and the DirectSubframeNumber is a positive integer.

In one embodiment, a range of the DirectSubframeNumber is an integer from 0 to 9.

Embodiment 6

Figure 6:
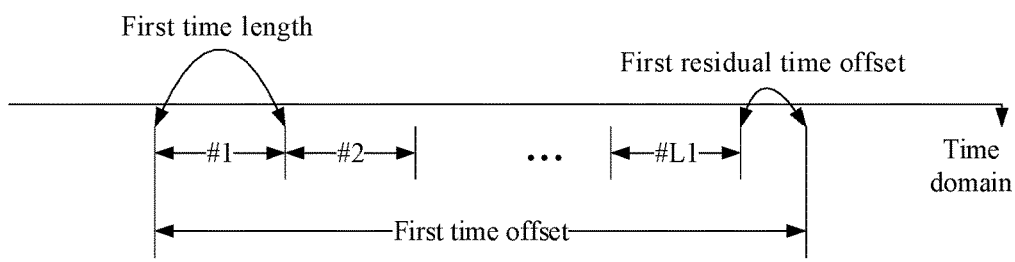
FIG. 6 illustrate a schematic diagram of a first time offset, a first time length and a first residual time offset according to one embodiment of the present disclosure.

Embodiment 6 illustrate a schematic diagram of a first time offset, a first time length and a first residual time offset according to one embodiment of the present disclosure, as shown in FIG. 6.

In embodiment 6, a first time offset comprises L1 first time length(s) and a first residual time offset, wherein the first residual time offset is not greater than the first time length.

In one embodiment, L1 is an integer not greater than 16 and not less than 0.

In one embodiment, the first time length is fixed.

In one embodiment, the first time length is configurable.

In one embodiment, the first time length is 1 ms.

In one embodiment, the first time length is a duration of a slot.

In one embodiment, the first time length comprises and only comprises 14 multicarrier symbols.

In one embodiment, the first time length is related to the first time offset.

Embodiment 7

Figure 7:
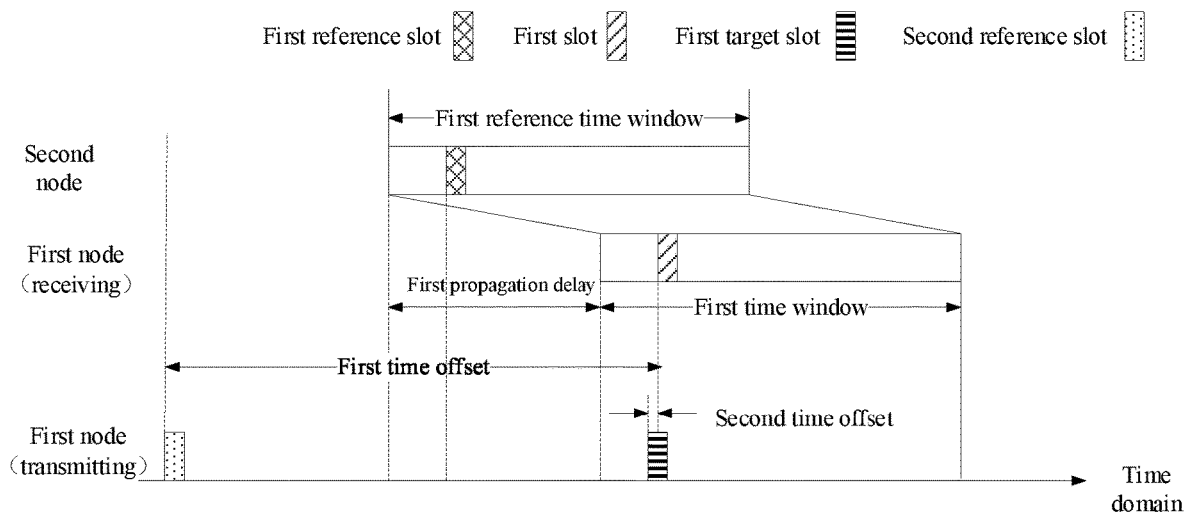
FIG. 7 illustrate a schematic diagram of a first time offset, a first time window and a second time offset according to one embodiment of the present disclosure.

Embodiment 7 illustrate a schematic diagram of a first time offset, a first time window and a second time offset according to one embodiment of the present disclosure, as shown in FIG. 7. In FIG. 7, the cross-line-filled rectangle, the slash-filled rectangle, the horizontal-line-filled rectangle and the dot-filled rectangle respectively represent a first reference slot, a first slot, a first target slot and a second reference slot.

In embodiment 7, a second node maintains a first reference time window, a first radio signal transmitted by the second node arrives at a first node side after a first propagation delay, the first node determines a first time window according to a received first radio signal, and the first time window is the peer of the first reference time window after the first propagation delay on the first node side.

The second node transmits first information and second information to the first node, the first information indicates a first reference slot in a first reference time window, that is, a first slot in a first time window; the second information indicates a first time offset; in response to the second information, the first node transmits a second radio signal in a first target slot.

In embodiment 7, the first target slot is advanced by a second time offset instead of a first time offset compared with the first slot.

In one embodiment, the first time offset may not fully compensate for an uplink TA (a deviation is partially indicated by DCI); a first target slot is closer to a first slot than a second reference slot (i.e., a second radio signal is transmitted in advance of a first time offset); since the first slot determines a synchronization timing according to a transmission signal of a second node, a synchronization timing to the first slot observed by an adjacent UE does not differ much, so a first target slot selected by the adjacent UE has little differences, avoiding interferences incurred by the different understanding of the first target slot by the adjacent UE.

Embodiment 8

Figure 8:
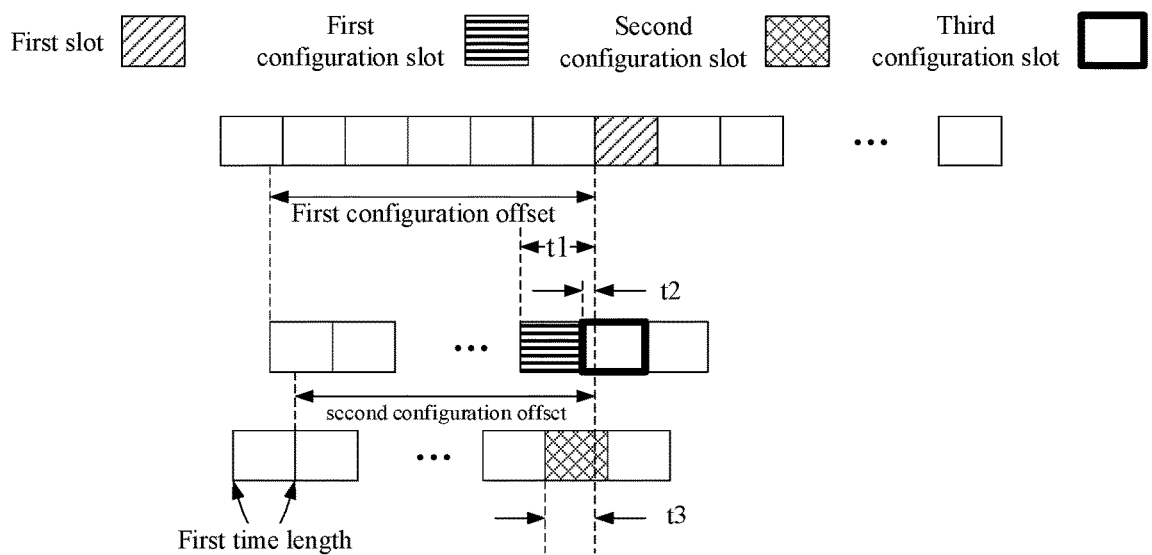
FIG. 8 illustrates a schematic diagram of a second time offset being related to a first residual time offset according to one embodiment of the present disclosure.

Embodiment 8 illustrates a schematic diagram of a second time offset being related to a first residual time offset according to one embodiment of the present disclosure, as shown in FIG. 8. In FIG. 8, the slash-filled rectangle, the horizontal-line-filled rectangle, the cross-line-filled rectangle and thick-line-framed rectangle respectively represent a first slot, a first configuration slot, a second configuration slot and a third configuration slot.

In embodiment 8, a first node determines a first slot according to received first information, determines a first residual time offset according to received second information, then transmits a second radio signal in a first target slot, and the first target slot is advanced by a second time offset compared with the first slot; when the first residual time offset is less than a first time threshold, a sum of the first residual time offset plus a first time length is equal to a second time offset; and when the first residual time offset is greater than a first time threshold, the first residual time offset is equal to a second time offset.

In one embodiment, a first time offset indicated by second information is a first configuration offset, a corresponding first residual time offset t2 is less than a first time threshold, and a second time offset is a sum of a first residual time offset plus a first time length, that is, t1; and a first target slot is a first configuration slot.

In one embodiment, a first time offset indicated by second information is a second configuration offset, a corresponding first residual time offset t3 is less than a first time threshold, and a second time offset is a first residual time offset, that is, t3; and a first target slot is a second configuration slot.

In one embodiment, when a first residual time offset is equal to the first time threshold, a sum of the first residual time offset plus the first time length is equal to the second time offset.

In one embodiment, when a first residual time offset is equal to the first time threshold, the first residual time offset is equal to the second time offset.

In one embodiment, the first time threshold is linearly correlated with the first time length.

In one embodiment, the first time threshold is half of the first time length.

In one embodiment, the first time threshold is ⅓ of the first time length.

In one embodiment, the first time threshold is configurable.

In one embodiment, the first configuration offset and the second configuration offset are respectively uplink TAs of two adjacent UEs, if the second time offset is fixed as a first residual time offset, the two UEs respectively select a first configuration slot and a third configuration slot as corresponding transmission slots of a first slot, resulting in large interferences. One advantage of embodiment 8 is that a slot occupied by the second radio signal is flexibly selected according to a first residual time offset, so as to maximize an overlapping time of a first target slot selected by an adjacent UE, thus reducing the interferences.

In one embodiment, the first time length is one of a first candidate length and a second candidate length.

In one embodiment, when an absolute value of a difference value between a first residual time offset and the first time threshold calculated according to a first candidate length is greater than a first time interval, the first time length is a first candidate length; otherwise, the first time length is a second candidate length.

The above embodiment can avoid an error of a first time length in understanding of an adjacent UE to a first target slot incurred by a first residual time offset too close to a first time threshold.

In one embodiment, the first time interval is half of the second candidate length.

In one embodiment, the first time interval is one third of the second candidate length.

In one embodiment, the first candidate length is a duration of a slot.

In one embodiment, the second candidate length is half of the first candidate length.

In one embodiment, the second candidate length is less than the first candidate length.

In one embodiment, the first candidate length comprises 14 multicarrier symbols, and SCSs of the 14 multicarrier symbols are the same as an SCS of a subcarrier occupied by a second radio signal.

Embodiment 9

Figure 9:
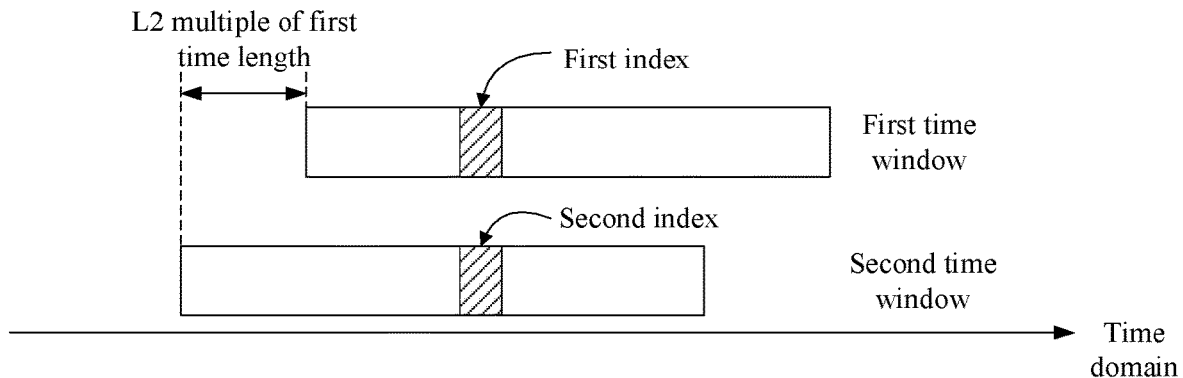
FIG. 9 is a schematic diagram of a first index and a second index according to one embodiment of the present disclosure.

Embodiment 9 illustrates a schematic diagram of a first index and a second index according to one embodiment of the present disclosure, as shown in FIG. 9. In FIG. 9, the slash-filled-rectangle is a second target slot.

A first transmitter in a first node transmits a third radio signal in a second target slot; when the third radio signal is transmitted in uplink, a first index is used to generate the third radio signal, and when the third radio signal is transmitted in sidelink, a second index is used to generate the third radio signal; a product of a difference value obtained by subtracting the first index from the second index multiplied by the first time length is equal to a difference value obtained by subtracting the second time offset from the first time offset.

In one embodiment, when the third radio signal is transmitted in uplink, a second node is a target receiver of the third radio signal.

In one embodiment, when the third radio signal is transmitted in uplink, the third radio signal is scheduled by a DCI transmitted by a second node.

In one embodiment, the first index is an index of the second target slot in a first time window.

In one embodiment, the second index is an index of the second target slot in a second time window, and an advanced time length of the second time window compared with the first time window is equal to a product of a difference value obtained by subtracting the first index from the second index multiplied by the first time length.

In one embodiment, the third radio signal indicates the first index.

In one embodiment, the third radio signal indicates a difference value between the second index and the first index.

In one embodiment, the first time window is an SFN cycle, the first index is $s_1+f_1 \cdot 10$, where $s_1$ and $f_1$ are respectively a slot number in a radio frame to which the second target slot belongs in the first time window and a frame number in the first time window of a radio frame to which the second target slot belongs in the first time window, where $s_1$ is not greater than 9 and not less than 0, and f is not greater than 1023 and not less than 0.

In one embodiment, the first time window is a Direct Frame Number (DFN) cycle, the first index is $s_2+f_2 \cdot 10$, where $s_2$ and $f_2$ are respectively a slot number in a radio frame to which the second target slot belongs in the second time window and a frame number in the first time window of a radio frame to which the second target slot belongs in the second time window, where $s_2$ is not greater than 9 and not less than 0, and $f_2$ is not greater than 1023 and not less than 0.

In one embodiment, the first time window is an SFN cycle, the first index is a frame number in the first time window of a radio frame to which the second target slot belongs in the first time window, and the first index is not greater than 1023 and not less than 0.

In one embodiment, the first time window is a DFN cycle, the first index is a frame number in the first time window of a radio frame to which the second target slot belongs in the second time window, and the first index is not greater than 1023 and not less than 0.

In one embodiment, the first index is used to generate an initial value generating a first scrambling sequence, the first scrambling sequence is used for scrambling a first bit block, and the third radio signal carries the first bit block.

In one embodiment, the initial value of the first scrambling sequence is linearly related to the first index.

In one embodiment, a linear correlation coefficient from the initial value of the first scrambling sequence to the first index is 512.

In one embodiment, the first index is used to generate a Cyclic Redundancy Check (CRC) of a first bit block, and the third radio signal carries the first bit block.

In one embodiment, the first index is used to generate an initial value of the CRC of a first bit block.

In one embodiment, the third radio signal is obtained after the first bit block sequentially goes through channel coding, scrambling, modulation, layer mapping, precoding, resource mapping and generation of an OFDM symbol.

In one embodiment, the third radio signal is obtained after the first bit block goes through scrambling, CRC coding, channel coding, rescrambling, modulation, resource mapping and generation of an OFDM signal.

In one embodiment, the first index is used to generate an initial value of the CRC of a first bit block.

In one embodiment, the second index comprises a DFN.

In one embodiment, the second index is used to generate an initial value of a second scrambling sequence, the second scrambling sequence is used to scramble a second bit block, and the third radio signal carries the second bit block.

In one embodiment, the initial value of the second scrambling sequence is linearly correlated to the second index.

In one embodiment, a linear correlation coefficient from the initial value of the second scrambling sequence to the second index is 512.

In one embodiment, the second index is used to generate a CRC of a second bit block, and the third radio signal carries the second bit block.

In one embodiment, the second index is used to generate an initial value of the CRC of a second bit block.

In one embodiment, the second index is used to generate an initial value of the CRC of a second bit block.

In one embodiment, the third radio signal is obtained after the second bit block sequentially goes through channel coding, scrambling, modulation, layer mapping, precoding, resource mapping and generation of an OFDM symbol.

Embodiment 10

Figure 10:
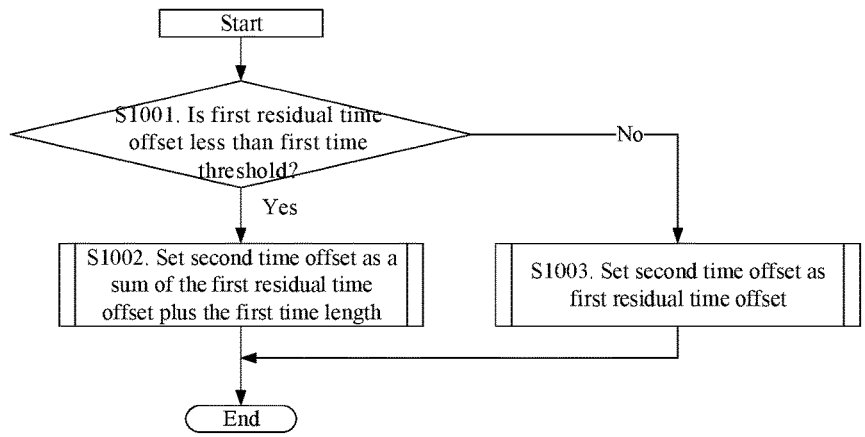
FIG. 10 illustrates a schematic diagram of determining a second time offset according to one embodiment of the present disclosure.

Embodiment 10 illustrates a schematic diagram of determining a second time offset according to one embodiment of the present disclosure, as shown in FIG. 10.

In step S1001, a first node judges whether a first residual time offset is less than a first time threshold; if yes, in step S1002, the first node sets the second time offset as a sum of the first residual time offset plus a first time length; if yes, in step S1003, the first node sets the second time offset as the first residual time offset.

In one embodiment, the first time threshold is half of the first time length.

In one embodiment, the step S1001, the step S1001, and the step S1001 are executed by a first transmitter in the first node.

In one embodiment, the first time length is one of a first candidate length and a second candidate length.

In one embodiment, when an absolute value of a difference value between a first residual time offset and the first time threshold calculated according to a first candidate length is greater than a first time interval, the first time length is a first candidate length; otherwise, the first time length is a second candidate length.

The above embodiment can avoid an error of a first time length in understanding of an adjacent UE to a first target slot incurred by a first residual time offset too close to a first time threshold.

In one embodiment, the first time interval is half of the second candidate length.

In one embodiment, the first time interval is one third of the second candidate length.

In one embodiment, the first candidate length is a duration of a slot.

In one embodiment, the second candidate length is half of the first candidate length.

In one embodiment, the second candidate length is less than the first candidate length.

In one embodiment, the first candidate length comprises 14 multicarrier symbols, and SCSs of the 14 multicarrier symbols are the same as an SCS of a subcarrier occupied by a second radio signal.

Embodiment 11

Figure 11:
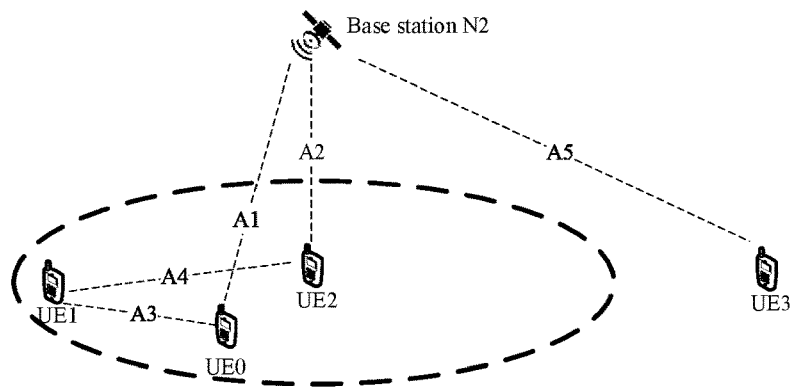
FIG. 11 illustrates a schematic diagram of an NTN base station being in communications with a UE according to one embodiment of the present disclosure.

Embodiment 11 illustrates a schematic diagram of an NTN base station being in communications with a UE according to one embodiment of the present disclosure, as shown in FIG. 11.

In embodiment 11, a base station N2 maintains serving cells of UE0, UE2 and UE3; links between the base station N2 and the UE0, the UE2 and the UE3 are respectively identified by dotted lines A1, A2 and A5.

In one embodiment, the UE3 and the base station N2 are respectively the first node and the second node, the UE3 transmits a second radio signal in a first target slot, and the base station N2 receives a useful signal from the UE0 or the UE2 on time-frequency resources occupied by the second radio signal.

In one subembodiment of the above embodiment, the base station N2 ensures reception quality of the useful signal by configuring transmit power of the second radio signal and transmit power of the useful signal.

In one subembodiment of the above embodiment, the base station N2 forms a receiving beam for the useful signal through receiving beamforming processing and keeping the UE3 outside the receiving beam to reduce interferences from a second radio signal.

In one embodiment, the base station N2 is a second node, and the UE0 and UE2 are two adjacent UEs; a first residual time offset determined by the UE0 as a first node is less than a first time threshold, and a determined second time offset is a sum of a first residual time offset plus a first time length; a first residual time offset determined by the UE2 as a first node is greater than a first time threshold, and a determined second time offset is a first residual time offset.

The above method can ensure a maximum overlapping between the UE0 and the UE2 for the selection of a first target slot, which avoids interferences incurred by the lack of understanding of the first slot between the UE0 and UE2; in addition, the above method also helps the UE1 select a synchronization reference source from the UE0 and UE2 (which avoids the confusion brought by excessive DFN out of step of UE0 and UE).

Embodiment 12

Figure 12:
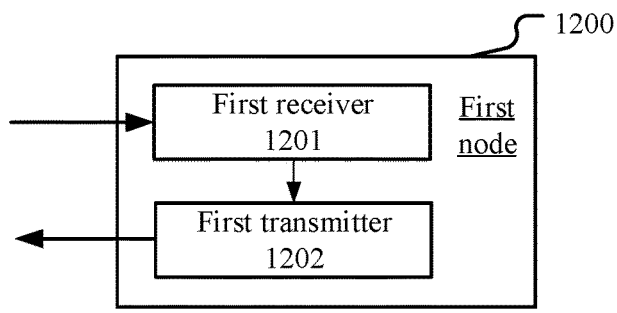
FIG. 12 illustrates a structure block diagram of a processing device in a first node according to one embodiment of the present disclosure.

Embodiment 12 illustrates a structure block diagram of a processing device in a first node according to one embodiment of the present disclosure, as shown in FIG. 12. In FIG. 12, a processing device 1200 in a first node comprises a first receiver 1201 and a first transmitter 1202.

The first receiver 1201 receives a first radio signal, first information and second information; the first transmitter 1202 transmits a second radio signal in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, when the first residual time offset is less than the first time threshold, a sum of the first residual time offset plus the first time length is equal to the second time offset; and when the first residual time offset is greater than a first time threshold, the first residual time offset is equal to the second time offset.

In one embodiment, the second information indicates a fourth time offset, the first time offset is linearly correlated with the fourth time offset, and a linear correlation coefficient from the first time offset to the fourth time offset is 1.

In one embodiment, the first transmitter transmits a third radio signal in a second target slot; when the third radio signal is transmitted in uplink, a first index is used to generate the third radio signal, and when the third radio signal is transmitted in sidelink, a second index is used to generate the third radio signal; a product of a difference value obtained by subtracting the first index from the second index multiplied by the first time length is equal to a difference value obtained by subtracting the second time offset from the first time offset.

In one embodiment, the third radio signal is transmitted in sidelink, and the third radio signal indicates the second index.

In one embodiment, the first node 1200 is a UE.

In one embodiment, the first node 1200 is a UE that supports large delay differences.

In one embodiment, the first node 1200 is a UE that supports NTN.

In one embodiment, the first node 1200 is an aircraft.

In one embodiment, the first transmitter 1202 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the first transmitter 1202 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the first receiver 1401 comprises at least the first five of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1401 comprises at least the first four of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1401 comprises at least the first three of the antenna 452, the receiver 454, the multi-antenna receiving processor 458, the receiving processor 456, the controller/processor 459, the memory 460 or the data source 467 in FIG. 4 of the present disclosure.

Embodiment 13

Figure 13:
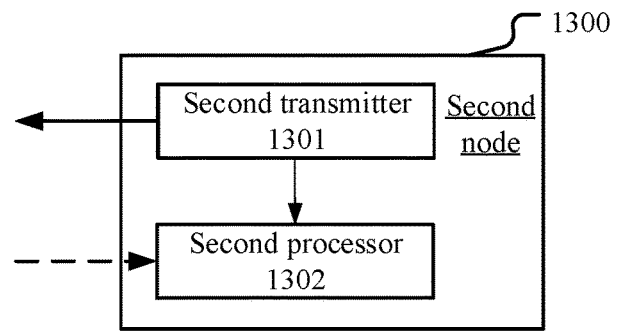
FIG. 13 illustrates a structure block diagram of a processing device in a second node according to one embodiment of the present disclosure.

Embodiment 13 illustrates a structure block diagram of a processing device in a second node according to one embodiment of the present disclosure, as shown in FIG. 13. In FIG. 13, a processing device 1300 in a second node comprises a second transmitter 1301 and a second processor 1302.

The second transmitter 1301 transmits a first radio signal, first information and second information; the second processor 1302 processes interferences from a second radio signal, the second radio signal is transmitted in a first target slot; herein, the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

In one embodiment, when the first residual time offset is less than the first time threshold, a sum of the first residual time offset plus the first time length is equal to the second time offset; and when the first residual time offset is greater than a first time threshold, the first residual time offset is equal to the second time offset.

In one embodiment, the second information indicates a fourth time offset, the first time offset is linearly correlated with the fourth time offset, and a linear correlation coefficient from the first time offset to the fourth time offset is 1.

In one embodiment, the second node 1300 is a base station.

In one embodiment, the second node 1300 is a base station supporting large delay differences.

In one embodiment, the second node 1300 is a base station supporting NTN.

In one embodiment, the second node 1300 is an aircraft.

In one embodiment, the second transmitter 1301 comprises the antenna 420, the transmitter 418, the transmitting processor 416 and the controller/processor 475.

In one embodiment, the second transmitter 1301 comprises the antenna 420, the transmitter 418, the multi-antenna transmitting processor 471, the transmitting processor 416 and the controller/processor 475.

In one embodiment, the second processor 1302 comprises the antenna 420, the receiver 418, the multi-antenna receiving processor 472, the receiving processor 470 and the controller/processor 475.

In one embodiment, the second processor 1302 comprises the controller/processor 475.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving a first radio signal, first information and second information; and
   a first transmitter, transmitting a second radio signal in a first target slot;
   wherein the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

2. The first node according to claim 1, wherein when the first residual time offset is less than a first time threshold, a sum of the first residual time offset plus the first time length is equal to the second time offset; and when the first residual time offset is greater than a first time threshold, the first residual time offset is equal to the second time offset.

3. The first node according to claim 1, wherein the second information indicates a fourth time offset, the first time offset is linearly correlated with the fourth time offset, and a linear correlation coefficient from the first time offset to the fourth time offset is 1.

4. The first node according to claim 1, wherein the first transmitter transmits a third radio signal in a second target slot; when the third radio signal is transmitted in uplink, a first index is used to generate the third radio signal, and when the third radio signal is transmitted in sidelink, a second index is used to generate the third radio signal; a product of a difference value obtained by subtracting the first index from the second index multiplied by the first time length is equal to a difference value obtained by subtracting the second time offset from the first time offset.

5. The first node according to claim 4, wherein the third radio signal is transmitted in sidelink, and the third radio signal indicates the second index.

6. The first node according to claim 4, wherein the first node is a UE, and a transmitter of the first information is a Non-Terrestrial Network (NTN) base station.

7. The first node according to claim 1, wherein the first radio signal comprises a Primary Synchronization Signal (PSS) and a Secondary Synchronization Signal (SSS), and a measurement performed on the first radio signal is used to determine a start time of a multicarrier symbol in the first time window.

8. A second node for wireless communications, comprising:
   a second transmitter, transmitting a first radio signal, first information and second information; and
   a second processor, processing interferences from a second radio signal, the second radio signal being transmitted in a first target slot;
   wherein the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

9. The second node according to claim 8, wherein when the first residual time offset is less than a first time threshold, a sum of the first residual time offset plus the first time length is equal to the second time offset; and when the first residual time offset is greater than a first time threshold, the first residual time offset is equal to the second time offset.

10. The second node according to claim 8, wherein the second information indicates a fourth time offset, the first time offset is linearly correlated with the fourth time offset, and a linear correlation coefficient from the first time offset to the fourth time offset is 1.

11. A method in a first node for wireless communications, comprising:
    receiving a first radio signal, first information and second information; and
    transmitting a second radio signal in a first target slot;
    wherein the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

12. The method in a first node according to claim 11, wherein when the first residual time offset is less than a first time threshold, a sum of the first residual time offset plus the first time length is equal to the second time offset; and when the first residual time offset is greater than a first time threshold, the first residual time offset is equal to the second time offset.

13. The method in a first node according to claim 11, wherein the second information indicates a fourth time offset, the first time offset is linearly correlated with the fourth time offset, and a linear correlation coefficient from the first time offset to the fourth time offset is 1.

14. The method in a first node according to claim 11, wherein the first transmitter transmits a third radio signal in a second target slot; when the third radio signal is transmitted in uplink, a first index is used to generate the third radio signal, and when the third radio signal is transmitted in sidelink, a second index is used to generate the third radio signal; a product of a difference value obtained by subtracting the first index from the second index multiplied by the first time length is equal to a difference value obtained by subtracting the second time offset from the first time offset.

15. The method in a first node according to claim 14, wherein the third radio signal is transmitted in sidelink, and the third radio signal indicates the second index.

16. The method in a first node according to claim 11, wherein the first radio signal comprises a Primary Synchronization Signal (PSS) and a Secondary Synchronization Signal (SSS), and a measurement performed on the first radio signal is used to determine a start time of a multicarrier symbol in the first time window.

17. The first node according to claim 11, wherein the first node is a UE, and a transmitter of the first information is a Non-Terrestrial Network (NTN) base station.

18. A method in a second node for wireless communications, comprising:
    transmitting a first radio signal, first information and second information;
    processing interferences from a second radio signal, the second radio signal being transmitted in a first target slot;
    wherein the first radio signal is used to indicate a synchronization timing of a first time window, the first time window comprises a plurality of slots, and the first information indicates a first slot out of the first time window; the second information indicates a first time offset; the first target slot is advanced by a second time offset compared with the first slot; the second time offset is related to a first residual time offset, a sum of the first residual time offset plus L1 first time length(s) is equal to the first time offset, L1 being a positive integer; the first residual time offset does not exceed the first time length; the second time offset does not exceed 2 times the first time length.

19. The method in a second node according to claim 18, wherein when the first residual time offset is less than a first time threshold, a sum of the first residual time offset plus the first time length is equal to the second time offset; and when the first residual time offset is greater than a first time threshold, the first residual time offset is equal to the second time offset.

20. The method in a second node according to claim 18, wherein the second information indicates a fourth time offset, the first time offset is linearly correlated with the fourth time offset, and a linear correlation coefficient from the first time offset to the fourth time offset is 1.

* * * * *